United States Patent [19]

Scales

[11] Patent Number: 4,606,363
[45] Date of Patent: Aug. 19, 1986

[54] AUTOMOTIVE AIR CONDITIONING SYSTEM FLUSHING APPARATUS

[76] Inventor: Frank J. Scales, 901 S. Second St., San Jose, Calif. 95112

[21] Appl. No.: 707,048

[22] Filed: Mar. 1, 1985

Related U.S. Application Data

[63] Continuation-in-part of Ser. No. 652,747, Sep. 19, 1984.

[51] Int. Cl.$^4$ ................................................ B08B 9/00
[52] U.S. Cl. .................................... 134/111; 134/113; 134/169 A
[58] Field of Search ........... 134/101, 102, 111, 166 R, 134/169 R, 169 A, 113

[56] References Cited

U.S. PATENT DOCUMENTS

| | | | |
|---|---|---|---|
| 1,585,025 | 5/1926 | Gorschalki et al. | 134/169 A |
| 1,721,444 | 7/1929 | Habel | 134/168 R |
| 1,955,199 | 4/1934 | Menge | 134/111 X |
| 2,029,232 | 1/1936 | Green | 165/95 |
| 2,222,516 | 11/1940 | Powell et al. | 141/1 |
| 2,425,848 | 8/1947 | Vawter | 134/111 X |
| 2,510,701 | 6/1950 | La Cross | 134/95 |
| 2,835,261 | 5/1958 | Wogan | 134/56 R |
| 3,115,145 | 12/1963 | Monteath, Jr. | 134/169 A X |
| 3,431,145 | 3/1969 | Riley | 134/169 A X |
| 3,528,854 | 9/1970 | Rutherford | 134/111 X |
| 3,951,185 | 4/1976 | Bower et al. | 134/169 R X |
| 4,015,613 | 4/1977 | Papworth | 134/102 |
| 4,059,123 | 11/1977 | Bartos et al. | 134/169 A |
| 4,109,703 | 8/1978 | Babish et al. | 165/95 |
| 4,127,160 | 11/1978 | Joffe | 134/169 A |
| 4,276,914 | 7/1981 | Albertson | 134/169 A |
| 4,412,551 | 11/1983 | Peters et al. | 134/169 A |

*Primary Examiner*—Philip R. Coe
*Attorney, Agent, or Firm*—Thomas Schneck

[57] ABSTRACT

An automotive air conditioning flushing apparatus having a solvent tank, a pressure tank, a multiple position sequencing valve and a filter or catch basin. A handle of the valve rotates through positions which sequentially direct solvent into the pressure tank by gravity feed, then pressurize the solvent from a remote pressure source and cause pressurized fluid to be delivered into an automotive cooling system, then release pressure and recycle or dispose of excess cleaning solvent. System components are stacked one above the other on an upright wheeled frame so that the entire apparatus may be easily moved about in an automotive service facility.

13 Claims, 12 Drawing Figures

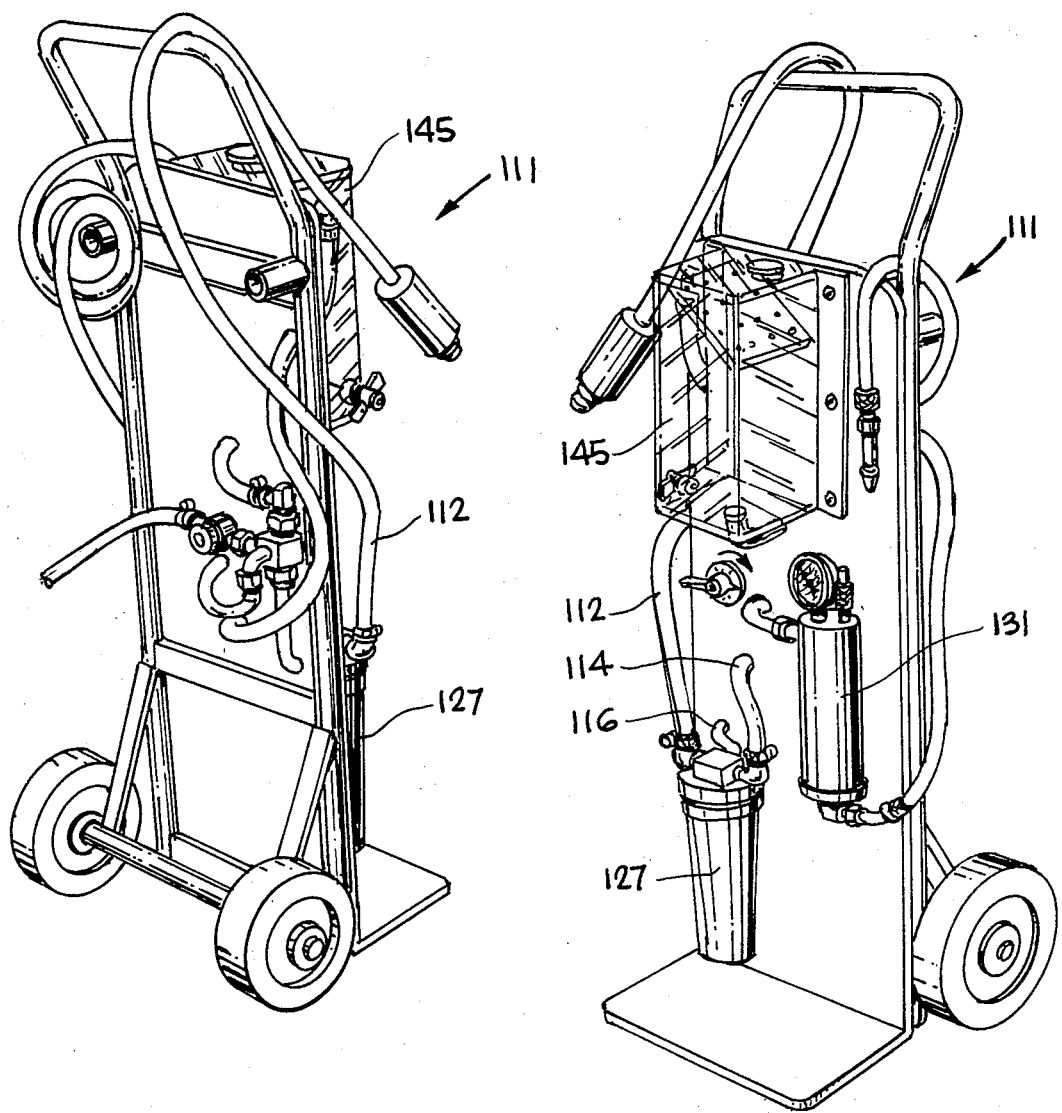

AUTOMOTIVE AIR CONDITIONING SYSTEM FLUSHING APPARATUS

CROSS REFERENCE TO RELATED APPLICATION

This is a continuation-in-part of prior application Ser. No. 652,747 filed Sept. 19, 1984.

TECHNICAL FIELD

The invention relates to apparatus for cleaning automotive air conditioning systems of automobiles.

BACKGROUND ART

Mobile flushing devices for automobiles are known. For example, U.S. Pat. No. 3,431,145 to Reilly shows a wheeled container having plural compartments and a means for injecting air under pressure for forcing fluid in one of the compartments into an automotive cooling system. While many devices of the prior art employ similar principals, there is a need for a flushing apparatus with a mechanism for protection against mistakes in carrying out the flushing operation. In a garage environment, mechanics are frequently interrupted in the middle of a job. In prior art devices, it is difficult to determine the state of a flushing operation, just by viewing the apparatus. An object of the present invention was to devise a flushing apparatus for automotive air conditioning systems whose condition in carrying out the multiple steps of a flushing operation would be apparent by viewing the device. Another object was to devise a compact construction for an air conditioning flushing apparatus which would fit in narrow spaces in an automotive garage.

SUMMARY OF INVENTION

The above objects have been achieved with a mobile flushing system which features an upright stacked construction.

A wheeled hand-truck is employed for the support structure having an upright frame which is tubular extending approximately chest-high on an adult. The frame has a handle which may be formed from the tubular material or may be projecting rearwardly from the tubular material. The frame further comprises a panel of sheet material which is connected to the tubular material and serves as a base for supporting the solvent tank, pressure tank, valve and filter or catch basin, plus the necessary accompanying hoses. The hand-truck has a lower forwardly projecting support lip which holds the catch basin. The filter or catch basin, pressure tank and solvent tank are generally vertically aligned and, because of the limited volume of automotive air conditioning systems, do not extend much further forwardly than the support lip. This enables the hand-truck to be moved into narrow spaces, such as those existing between automobiles in a service facility.

A multiple position valve, with various handle positions corresponding to the steps of a flushing operation controls the flushing operation. Further, transparent tanks are provided for determining the presence or absence of clean and dirty solvent.

The multiple position valve features a first position for enabling solvent flow from a solvent tank to a pressure tank. A second position of the valve pressurizes the pressure tank and causes pressurized solvent to leave the tank toward an automotive air conditioning system. A third position is for pressure release from the pressure tank, allowing unused solvent to be directed into a filter or catch basin mounted below the pressure cylinder. A fourth position of the sequencing valve represents a back flushing or an "off" position.

In one embodiment a filter allows recycling of solvent by removing particulate debris after a cleaning operation.

The flushing apparatus of the present invention is easy to use, light weight, and has safety provisions not found in the prior art.

BRIEF DESCRIPTION OF THE DRAWINGS

FIG. 8 is a rear perspective view of an alternate embodiment of the apparatus of the present invention.

FIG. 9 is a front perspective view of the apparatus illustrated in FIG. 8.

BEST MODE FOR CARRYING OUT THE INVENTION

Figure 1:
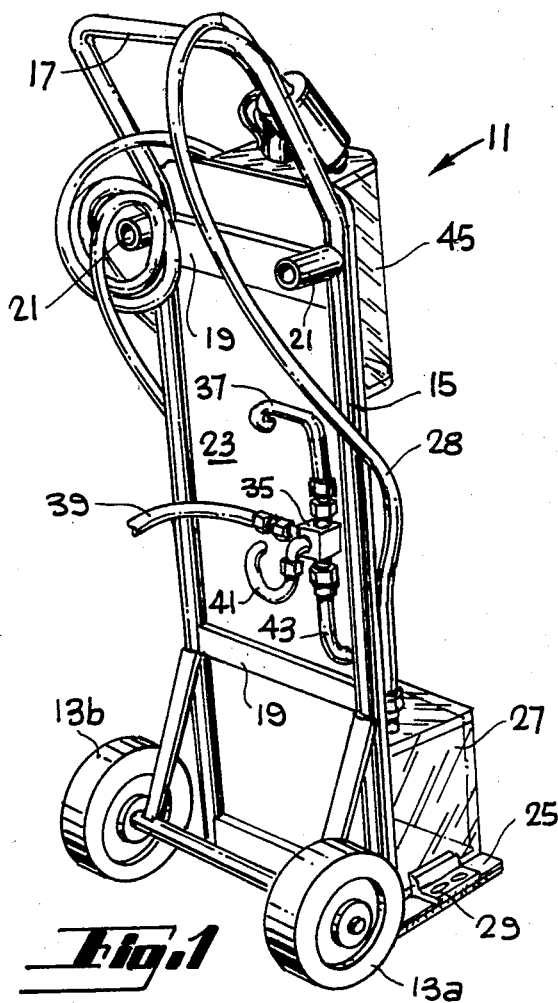
FIG. 1 is a rear perspective view of the apparatus of the present invention.
Figure 2:
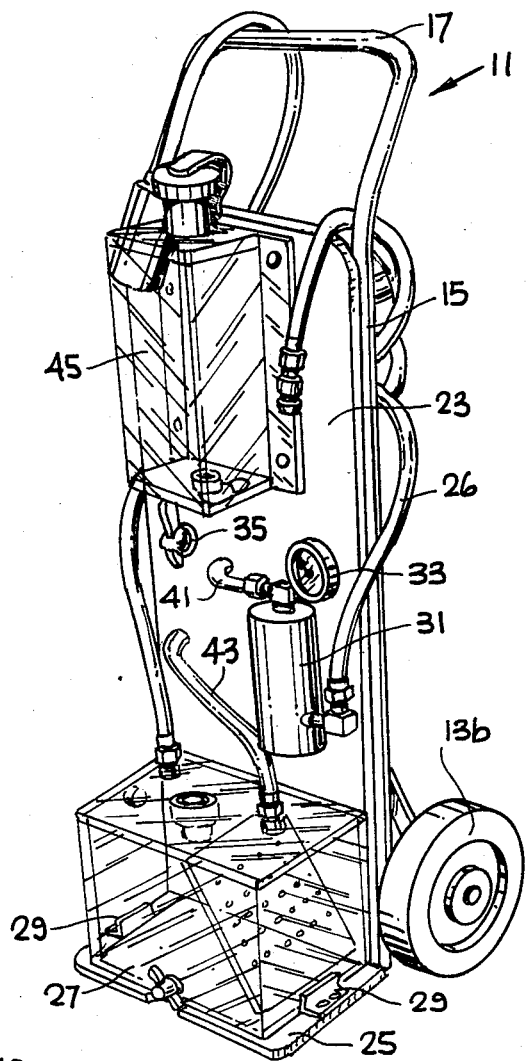
FIG. 2 is a front perspective view of the apparatus illustrated in FIG. 1.

With reference to FIGS. 1 and 2, a hand-truck 11 is shown having a pair of wheels 13a and 13b, an upright tubular frame 15 having a top 17 which connects left and right tubular side members. Braces 19 also connect opposed frame side members. Top 17 is typically waist-to-chest high on an adult person and the top may be curved rearwardly to serve as a handle in the usual way. Alternatively, a handle may be connected to the frame, indicated by handle members 21. A sheet panel 23 is secured to the frame and serves as a mounting base for flushing system components. Panel material may be wood, a synthetic material or metal. Three-quarter inch plywood is an ideal material. A lip 25 projects forwardly from the frame at ground level. The support lip is approximately 18 inches in width and projects forwardly from the frame approximately 12 inches. These dimensions are not critical, so long as the lip 25 is able to adequately support catch basin 27, mounted on lip 25 by brackets 29.

The support panel mounts a pressure tank 31 having a visible pressure gauge 33. The pressure tank is mounted above catch basin 27 and slightly to one side of the panel. On the opposite side a multi-position valve 35 is mounted having multiple inlets and outlets. These inlets and outlets, visible in FIG. 1 on the backside of the panel, include a line 37 carrying a supply of solvent from the solvent tank to the valve; line 39 connected to a remote fluidic pressure tank, such as an air tank; line 41 transmitting solvent and fluidic pressure to the pressure tank; line 43 connected to catch basin 27 for pressure relief.

Above the valve, a solvent tank 45 is mounted. This solvent tank is preferably transparent, just like catch basin 27 so that solvent volume is readily apparent, including clean solvent in solvent tank 45 or dirty solvent in catch basin 27. A first long hose 26 is used to deliver pressurized solvent from pressure tank 31 to the inlet of an automotive air conditioning system. A second long hose 28 is used to bring dirty solvent from the outlet of an automotive air conditioning system into catch basin 27.

Figure 3:
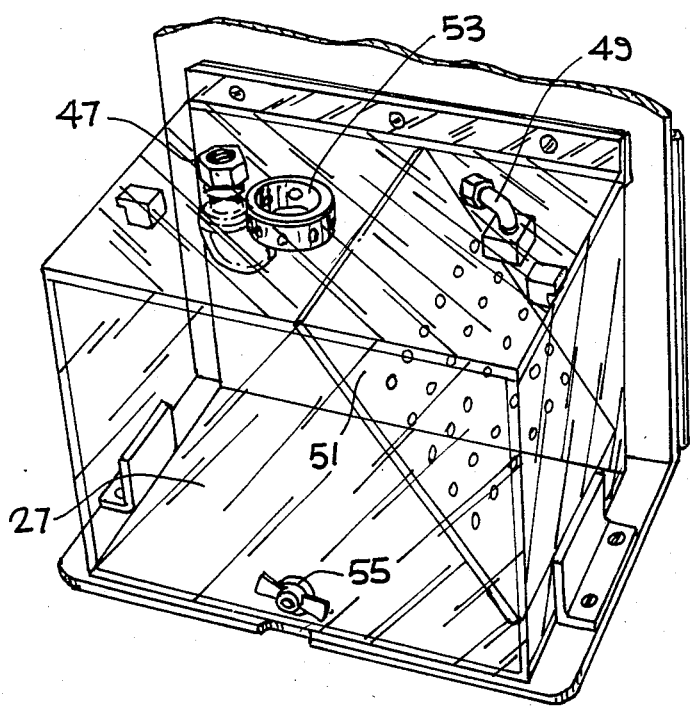
FIG. 3 is a perspective detail of the apparatus illustrated in FIG. 2, featuring a catch basin.

FIG. 3 shows the details of catch basin 27, including a first fitting 47 for connection to a hose extending from the outlet port of an automotive air conditioning system. A second fitting 49 connects with a pressure relief hose extending from the valve. An optional baffle 51 may be provided for sound dampening purposes. The baffle includes a number of holes which allow liquid falling on one side of the baffle to travel to the other side and to equalize pressure on both sides of the baffle. A vent 53 is provided to equalize pressure inside and outside of the basin. A spigot 55 is provided for emptying the catch basin.

Figure 4:
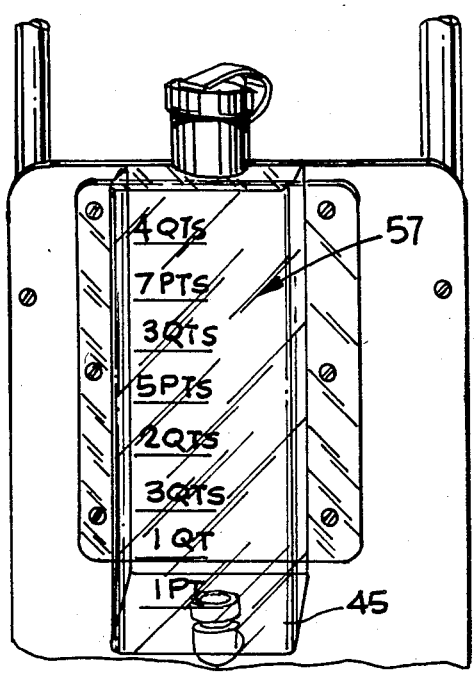
FIG. 4 is a front perspective view of a detail of the apparatus shown in FIG. 2, featuring a solvent tank.

With reference to FIG. 4, solvent tank 45 is seen in closer detail. The tank may be provided with gradations 57 for determining the volumetric level present in the tank and flowing into the pressure tank.

Figure 5:
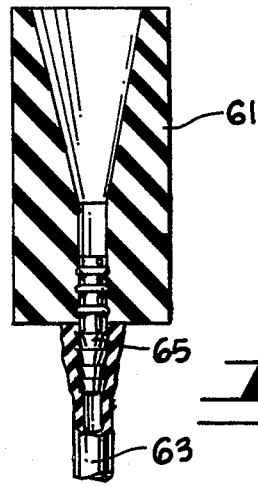
FIG. 5 is a sectional view of a fitting employed in the present invention.
Figure 6:
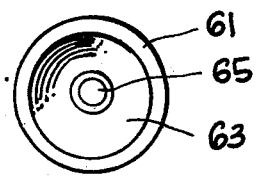
FIG. 6 is a front elevation of the fitting illustrated in FIG. 5.

FIGS. 5 and 6 show the manner of connection of hoses to an automotive air conditioning system. The air conditioning system typically has a rubber hose 61 associated with an inlet or outlet. A second hose 63 connects the flushing apparatus of the present invention with an air conditioning system. A metal or plastic ribbed pipe 65 connects the two together.

Figure 7:
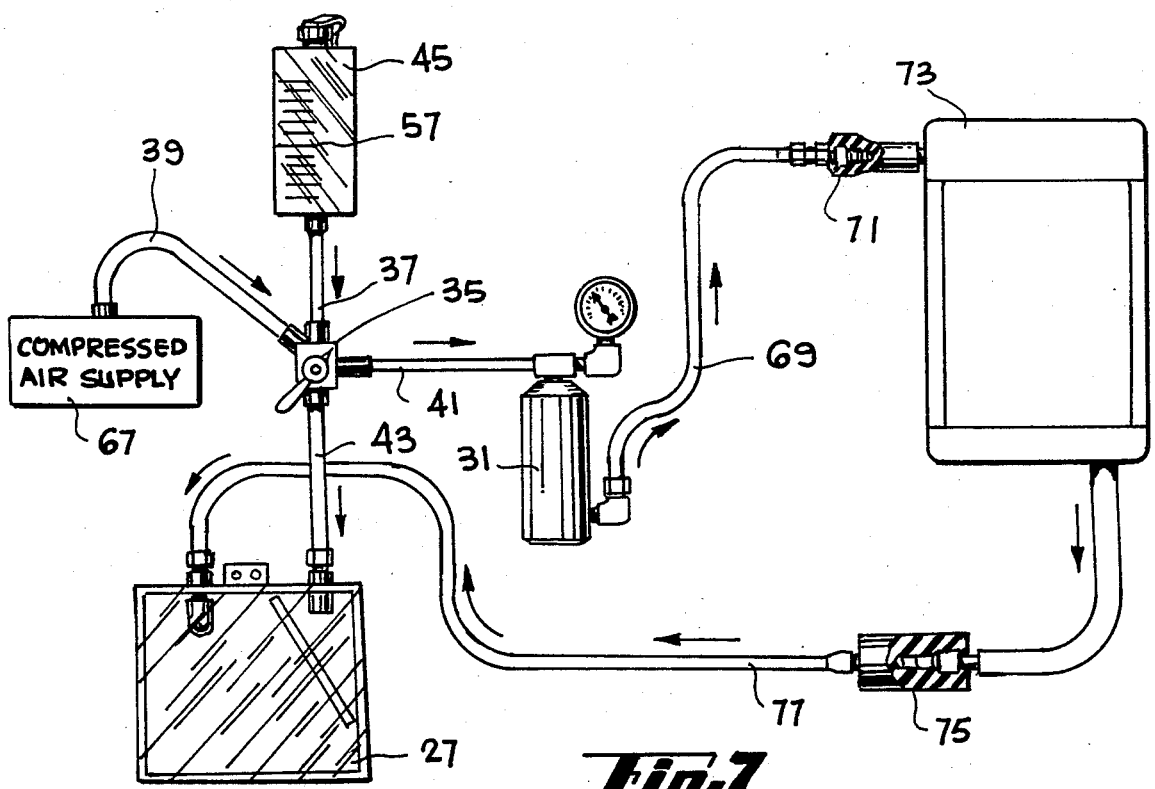
FIG. 7 is a plan view illustrating use of the apparatus of the present invention.

Operation of the invention may be seen with reference to FIG. 7. A sequencing valve 35 is first placed in the 12 o'clock position allowing fluid from solvent tank 45 to flow downwardly through hose 37 through the valve and through hose 41 into pressure tank 31 by gravity flow. The volume of tank 31 may limit the amount of solvent admitted to the tank or an operator may judge the amount by gradations on the solvent tank. Both of these approaches are used to limit solvent volume to an amount of solvent for one cleaning cycle. A second position of the handle of valve 35 is the three o'clock position which causes fluid pressure from a remote supply 67 to be delivered through hose 39 to the valve and onto the pressure tank 31. On reaching a predetermined pressure, pressurized solvent is forced out of the pressure tank and through hose 69 to the junction 71 which introduces pressurized solvent to the automotive air conditioning system 73. On passing through the air conditioning system, dirty solvent travels through a second junction 75 and into return hose 77 for delivery into catch basin 27. In a third position, when the handle of valve 35 is in the six o'clock position, pressure from the pressure tank may be relieved and unused solvent dumped through hose 43 from the tank into the catch basin. Lastly, when the handle of valve 35 is in the nine o'clock position, the valve is secured and in an off condition.

The sequential movements of the valve handle allow an operator to immediately determine which cleaning operation is in progress, even if the person is interrupted. Since the pressure tank is usually of a size which holds only enough solvent for a single cleaning cycle, it is not possible to treat readings on pressure valve 33 in an ambiguous manner. If the pressure on the valve corresponds approximately to the pressure at fluidic pressure supply 67, then the tank has not been discharged and is ready for discharge. On the other hand, if pressure is less than the supply pressure, pressurized solvent has been released to the air conditioning system and the next step is pressure relief. Thus, even if valve 35 becomes inoperative, pressure gauge 33 is indicative of the state of the pressure tank. Although the pressure tank only holds enough solvent for a single cleaning cycle, the volume introduced is somewhat variable and is controlled by the duration of the handle of valve 35 in the twelve o'clock position. A user may watch the gradations 57 to determine when a sufficient volume of solvent has flowed into the pressure tank for a cleaning operation of a particular automotive component.

FIGS. 8 and 9 illustrate a preferred embodiment of the invention. This embodiment is similar to the embodiment shown in FIGS. 1 and 2 except that a filter canister 127 replaces catch basin 27. Filter 127 is mounted on hand truck 111 which is substantially identical in construction to hand truck 11 of FIGS. 1 and 2. Filter 127 has an inlet 112 and an outlet 114 with a tubular filter element in the flow path therebetween. This filter element has a preferred pore size of ten microns, but will be effective between five and twenty microns. The filter element is tubular in shape, having the inlet communicating with the outside periphery of the tubular element and the outlet communicating with the axial center of the tubular element. A pressure relief line 116 also communicates with the center of the tubular element. The filter and filter element are similar in construction to cartridge-type swimming pool filters, except that the element is made of a micro-pore polymer such as polypropylene. Such filters are sold under the trademark Micro Wynd II. The object of using such a filter is to recycle solvent back to solvent tank 145, with particulate debris removed, so that the solvent can be reintroduced into pressure tank 131.

Figure 10:
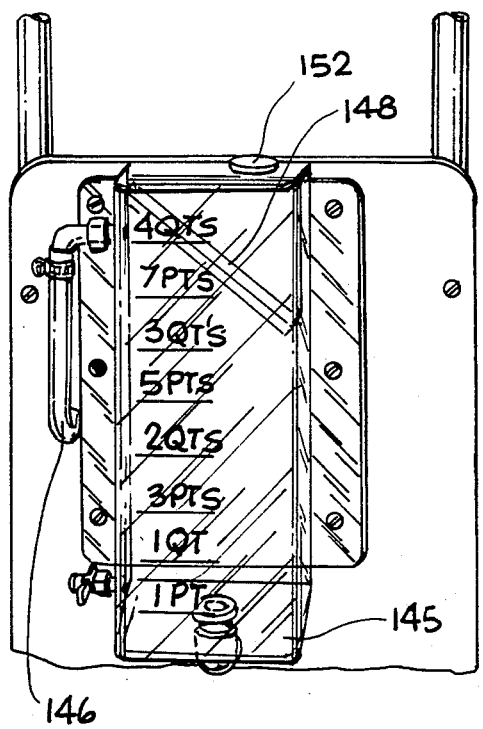
FIG. 10 is a front perspective view of a detail of the apparatus shown in FIG. 9, featuring a solvent tank.
Figure 11:
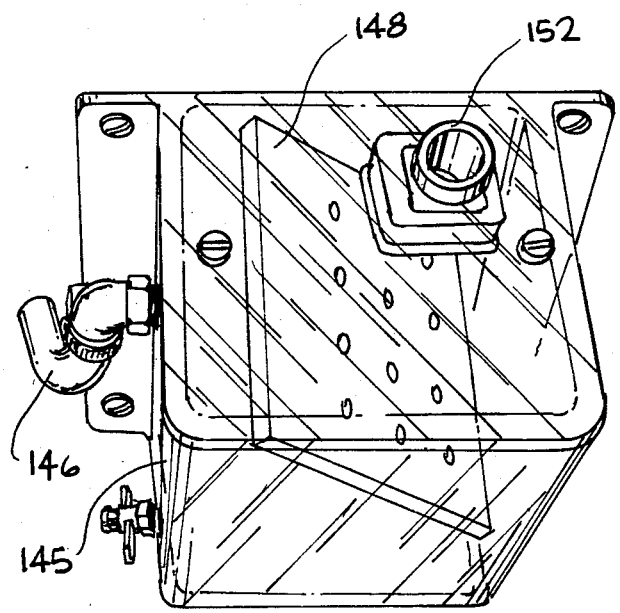
FIG. 11 is a top perspective view of the solvent tank illustrated in FIG. 10.

FIGS. 10 and 11 show the solvent tank 145 which receives recycled solvent through feedline 146. Tank 145 features a baffle 148 against which a fluid stream is directed, from hose 146 coming from the filter. This baffle directs fluid downwardly to the bottom of the tank. The top of the tank includes a vent 152.

Figure 12:
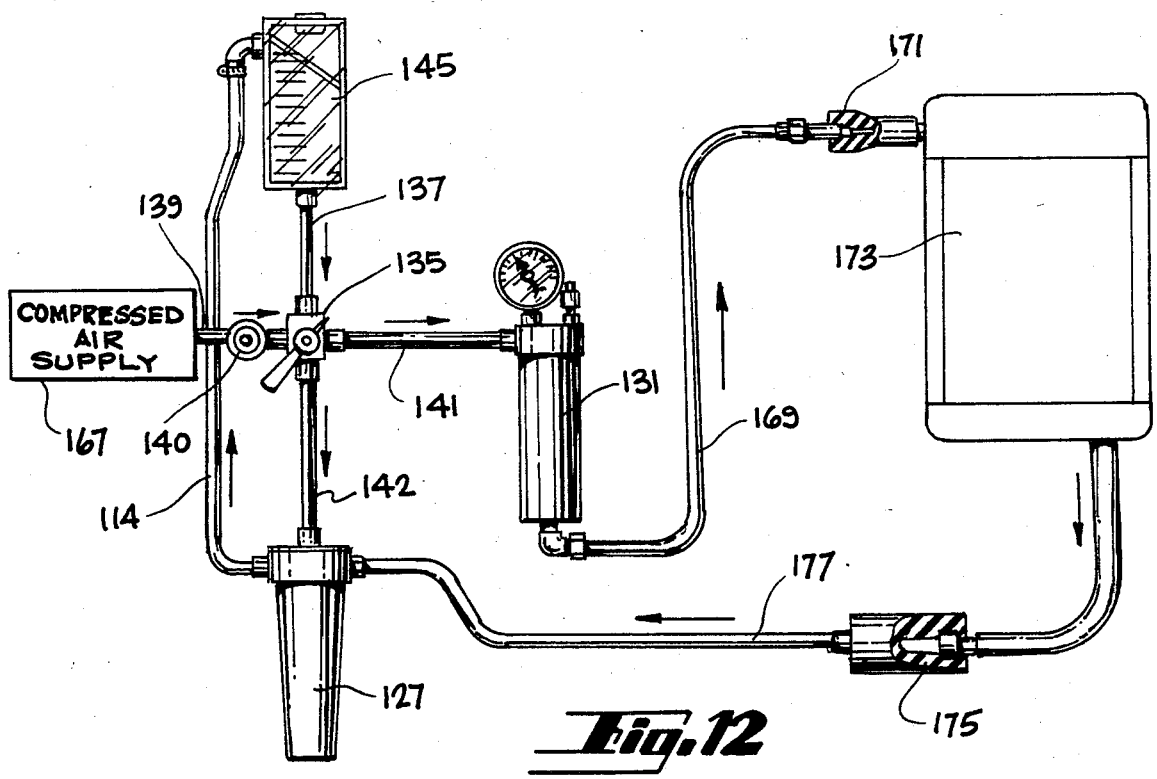
FIG. 12 is a plan view illustrating use of the apparatus shown in FIGS. 8 and 9.

Operation of this preferred embodiment may be seen with reference to FIG. 12. A sequencing valve 135 is placed in the 12 o'clock position allowing fluid from the solvent tank 145 to flow downwardly through hose 137 through the valve and through hose 141 into pressure tank 131 by gravity flow. A second position of the valve 135 is the 3 o'clock position which causes fluid pressure from a remote compressed air supply 167 to be delivered through hose 139 and regulator 140 to the valve and to the pressure tank 131. On reaching a predetermined pressure, pressurized solvent is forced out of the pressure tank and through hose 169 and into the elastomeric junction 171 which mates with an inlet to the automotive air conditioning system 173. A catch nozzle similar to that shown in FIG. 5 receives the outflow from the air conditioning system into return hose 177 for delivery to the inlet side of filter 127. This nozzle has an internally tapered bore for mating with different sizes of outlets. Moreover, since the nozzle is elastomeric it can be placed in an outlet and remain in place, allowing one man to operate the entire system. Debris, including large and small particulates are trapped on the outer surface of the filter while solvent passes through the tubular filter element. Having passed through the filter, the clean solvent emerges through outlet line 114 leading to solvent tank 145. If the valve is placed in the 6 o'clock position, pressure is relieved from the pressure tank 131 into the center of the filter element through line 142. This has two beneficial effects. First, the sound of the expanding gas is muffled by the filter element since it acts similar to a car muffler. Second, the gas passing from the inside of the filter toward the outside has a back flushing effect. Particles impacted on the outer surfaces of the filter will be dislodged and fall to the bottom of the filter container, thereby allowing the filter to have a longer life without cleaning.

At the outset of operations, if the valve has been placed to the 9 o'clock position, rather than the 3 o'clock position, gas would have been directed from the supply 167 into the center of the filter through line 142, just as in the pressure relief operation. Thus, another way of achieving a back flushing operation is to place the valve in the 9 o'clock position. The embodiment of the invention described in FIGS. 8-12 is especially useful because the cost of solvent is significant. While previously solvent was discarded after a single pass through an automotive air conditioning system, it can now be used for several passes, while still remaining effective and visible in the solvent tank.

Besides the apparent safety features of the present invention, components are stacked vertically, one above the other on a hand-truck. This is easily done since the volume in the solvent tank usually does not exceed much more than one gallon. This allows the automotive air conditioning flushing apparatus of the present invention to be moved between closely parked vehicles in an automotive service facility. The present invention is clean, convenient, easy to use and efficient. Moreover, the system lends itself to one-man operation.

I claim:

1. An apparatus for flushing of dirty fluid chambers using an external supply of fluidic pressure comprising,
    a support frame having two wheels contacting the ground,
    a solvent tank connected to the frame, the tank having an inlet and an outlet, with a hose extending downwardly from the outlet,
    a filter mounted on the frame and having an inlet and an outlet, with a filter element interposed therebetween, the filter having a fluid material inlet means for receiving fluid material from a dirty fluid chamber, said filter mounted in vertical alignment with said solvent tank,
    a pressure tank mounted on the frame, in vertical alignment below said solvent tank and above said filter, said pressure tank having an input means and an output means, the output means for connection to a dirty fluid chamber whereby pressurized fluid may be directed from the pressure tank, through the dirty fluid chamber, toward the filter,
    a pressure gauge mounted to said pressure tank, and
    a valve associated with the pressure tank, said valve having fluidic connections to said solvent tank outlet hose, to said pressure tank input, and to an external supply of fluidic pressure, said valve having a rotating handle which, when turned, sequentially admits solvent from the solvent tank to said pressure tank in a first position, then pressurizes said solvent with said fluidic pressure supply means in a second position, then releases pressure in a third position.

2. The apparatus of claim 1 wherein said solvent tank, pressure tank, valve and filter are aligned in vertical orientation one above the other.

3. The apparatus of claim 1 wherein said filter is a tubular filter having a pore size in the rang of 5 to 20 microns.

4. The apparatus of claim 3 wherein said third valve position is connected to the interior of said tubular filter for noise filtering upon pressure release.

5. The apparatus of claim 1 wherein said pressure supply means comprises a hose connected to a remote air pressure supply tank.

6. The apparatus of claim 1 wherein said solvent tank includes a graduated solvent volume measuring scale.

7. An apparatus for pressurized flushing of dirty automotive air conditioning systems using a supply of fluidic pressure comprising,
    an upright hand-truck having an upright frame, two wheels connected to the frame for contacting the ground, a low-level support lip projecting from the frame and having a forward edge, the upright frame having a top at approximately chest height on an adult with a handle near the top of the frame,
    a solvent tank connected to the frame, the tank having an inlet and an outlet, with a hose extending downwardly from the outlet,
    a filter mounted near the support lip aligned in vertical orientation below said solvent tank and having an inlet and an outlet, with a filter element interposed therebetween, the filter having a fluid material inlet means for receiving fluid material from a dirty automotive air conditioning system
    a pressure tank mounted on the frame, aligned in vertical orientation below said solvent tank and above said filter, said pressure tank having an input means and an output means, the output means for connection to the dirty automotive air conditioning system whereby pressurized fluid may be directed from the pressure tank, through the dirty automotive air conditioning system, toward the filter,
    a pressure gauge mounted to said pressure tank, and
    a valve associated with the pressure tank, said valve having fluidic connections to said solvent tank outlet hose, to said pressure tank input and to a supply of fluidic pressure, said valve having a rotating handle which, when turned, sequentially admits solvent from the solvent tank to said pressure tank in a first position, then pressurizes said solvent with said fluidic pressure supply means in a second position, then releases pressure in a third position.

8. The apparatus of claim 7 wherein said solvent tank, pressure tank, valve and filter are aligned in vertical orientation in a manner limited in the extent of forward projection to the vicinity of the forward edge of said lip.

9. The apparatus of claim 7 wherein said frame comprises a braced tubular member connected to said lip and a panel, said panel securing said solvent tank and said pressure tank.

10. The apparatus of claim 7 wherein said filter is a tubular filter having a pore size in the range of 5 to 20 microns.

11. The apparatus of claim 10 wherein said third valve position is connected to the interior of said tubular filter for noise filtering upon pressure release.

12. The apparatus of claim 7 wherein said pressure supply means comprises a hose connected to a remote air pressure supply tank.

13. The apparatus of claim 7 wherein said solvent tank includes a graduated solvent volume measuring scale.

* * * * *